US012729981B2

(12) United States Patent
Liao

(10) Patent No.: US 12,729,981 B2
(45) Date of Patent: Sep. 8, 2026

(54) INSTALLATION ANGLE CALIBRATION METHOD, VEHICLE-MOUNTED DEVICE, AND STORAGE MEDIUM

(71) Applicant: HON HAI PRECISION INDUSTRY CO., LTD., New Taipei (TW)

(72) Inventor: Jhen-Kai Liao, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 254 days.

(21) Appl. No.: 18/760,035

(22) Filed: Jul. 1, 2024

(65) Prior Publication Data

US 2025/0189345 A1 Jun. 12, 2025

(30) Foreign Application Priority Data

Dec. 6, 2023 (CN) ......................... 202311665740.2

(51) Int. Cl.
*G01C 25/00* (2006.01)
*G01C 21/16* (2006.01)

(52) U.S. Cl.
CPC ........... *G01C 25/005* (2013.01); *G01C 21/16* (2013.01)

(58) Field of Classification Search
CPC .............................. G01C 25/005; G01C 21/16
See application file for complete search history.

(56) References Cited

U.S. PATENT DOCUMENTS 9,581,615 B2 * 2/2017 Basir .................... G01C 21/185
9,958,473 B1 * 5/2018 Sljivar ...................... G01P 1/04
2010/0318257 A1 * 12/2010 Kalinadhabhotla ..... G01P 21/00 701/31.4
2013/0081442 A1 * 4/2013 Basir ...................... G01C 25/00 73/1.38

* cited by examiner

*Primary Examiner* — Jonathan M Dunlap
(74) *Attorney, Agent, or Firm* — ScienBiziP, P.C.

(57) ABSTRACT

An installation angle calibration method implemented in a vehicle-mounted device includes defining a first coordinate system corresponding to an IMU of a vehicle according to first IMU data obtained from the IMU, and determining a rotation angle of a first coordinate system relative to a second coordinate system where the vehicle is located; updating the first coordinate system based on the first rotation angle, and obtaining a third coordinate system corresponding to the IMU; obtaining the second IMU data of the vehicle, and extracting target peak data from the second IMU data; determining a second rotation angle of the third coordinate system relative to the second coordinate system based on the target peak data; and determining the installation angle of the IMU relative to the vehicle based on the first rotation angle and the second rotation angle.

20 Claims, 6 Drawing Sheets six situations of the original coordinate system

Ex.

$Z^p = -X^b$ $X^p = Z^b$ $Y^p = Y^b$

INSTALLATION ANGLE CALIBRATION METHOD, VEHICLE-MOUNTED DEVICE, AND STORAGE MEDIUM

FIELD

The subject matter herein generally relates to a field of smart driving and involves a technology of coordinate system calibration, and particularly to an installation angle calibration method, a vehicle-mounted device and a storage medium.

BACKGROUND

An inertial measurement unit (IMU) is a sensor used to obtain gesture information of vehicles, vehicle gesture and displacement information can be analyzed through IMU data, to help control and navigate the vehicles. Since the IMU data is affected by the installation angle, it is necessary to calibrate the installation angle of the IMU when analyzing the vehicle using the IMU. The IMU installation angle calibration method in related technologies requires other sensors or complex filter models, or requires to pre-determine an initial value of the IMU installation angle and then perform error calibration, or requires to be implemented in complex application environments, for example, a long straight road is required to enable the vehicle to reach a high speed or acceleration for error calibration, therefore, calculation cost is high and calculation efficiency is low.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
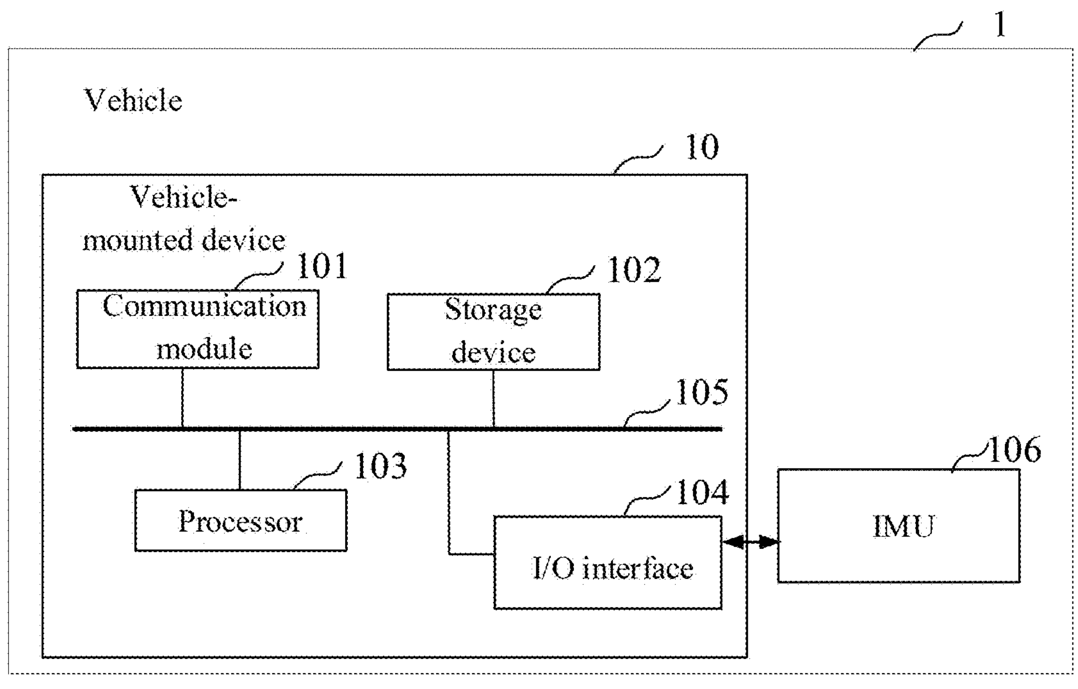
FIG. 1 is a structural view of an embodiment of a vehicle-mounted device according to the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles so characterized do not exclude other elements or articles. The terms "connect", "link" or the like are not limited to physical or mechanical connection, but may include electrical connections, whether direct or indirect.

In one embodiment, an IMU is a sensor used to obtain gesture information of vehicles, vehicle gesture and displacement information can be analyzed through IMU data, to help control and navigate the vehicles. Since the IMU data is affected by the installation angle, it is necessary to calibrate the installation angle of the IMU when analyzing the vehicle using the IMU. The IMU installation angle calibration method in related technologies requires other sensors or complex filter models, or requires to pre-determine an initial value of the IMU installation angle and then perform error calibration, or requires to be implemented in complex application environments, for example, a long straight road is required to enable the vehicle to reach a high speed or acceleration for error calibration, therefore, calculation cost is high and calculation efficiency is low.

In order to solve the above problems, the embodiments provide an installation angle calibration method, the installation angle calibration method includes defining a first coordinate system corresponding to the IMU based on first IMU data obtained from the IMU of the vehicle, and determining a first rotation angle of a first coordinate system relative to a second coordinate system where the vehicle is located; updating the first coordinate system based on the first rotation angle, and obtaining a third coordinate system corresponding to the IMU; obtaining second IMU data of the vehicle, and extracting target peak data from the second IMU data; determining a second rotation angle of the third coordinate system relative to the second coordinate system based on the target peak data; determining the installation angle of the IMU relative to the vehicle, based on the first rotation angle and the second rotation angle. It is possible to calibrate the installation angle of the IMU based on the IMU data of the vehicle in different states without installing other sensors, using complex models, or resorting to complex application environments. It can calibrate the IMU at any angle installed at any position on the vehicle, the installation angle can be calibrated in real time, thereby reducing the cost and difficulty of IMU calibration and improving the efficiency of IMU calibration. In addition, sensor data obtained from other sensors can also be used to further improve the accuracy of IMU installation angle calibration.

FIG. 1 is a schematic structural view of a vehicle-mounted device according to an embodiment of the present application. The embodiment of the present application does not place any restrictions on the specific type of the vehicle-mounted device.

Referring to FIG. 1, the vehicle-mounted device 10 can be installed in the vehicle 1. The vehicle-mounted device 10 can include a communication module 101, a storage device 102, a processor 103, an input/output (I/O) interface 104 and a bus 105. The processor 103 is coupled to the communication interface 101, the storage device 102, and the I/O interface 104 through the bus 105, respectively.

The communication module 101 may include a wired communication module and/or a wireless communication module. The wired communication module can provide wired communication solutions such as one or more of universal serial bus (USB), Controller Area Network (CAN), Local Interconnect Network (LIN), and Flexray vehicle network standards. Wireless communication modules can provide wireless fidelity (Wi-Fi), Bluetooth (BT), mobile communication network, frequency modulation (FM), near field communication technology (NFC), infrared technology (IR), and other wireless communication solutions.

The storage device 102 may include one or more random access memories (RAM) and one or more non-volatile memories (NVM). The random access memory can be directly read and written by the processor 103, can be used to store executable programs (such as machine instructions) of the operating system or other running programs, and can also be used to store user and application data, etc. Random access memory can include static random-access memory (SRAM), dynamic random access memory (DRAM), synchronous dynamic random access memory (SDRAM), double data rate Synchronous dynamic random access memory (DDR SDRAM), etc.

The non-volatile memory can also store executable programs and user and application data, etc., and can be loaded into the random access memory in advance for direct reading and writing by the processor 110. Non-volatile memory can include disk storage devices and flash memory.

The storage device 102 is used to store one or more computer programs. One or more computer programs are configured for execution by processor 103. The one or more computer programs include a plurality of instructions. When the plurality of instructions are executed by the processor 103, the installation angle calibration method executed on the vehicle-mounted device 10 can be implemented.

In other embodiments, the vehicle-mounted device 10 further includes an external memory interface for connecting to an external memory to expand the storage capacity of the vehicle-mounted device 10.

The processor 103 may include one or more processing units. For example, the processor 103 may include an application processor (AP), a modem processor, a graphics processing unit (GPU), an image signal processor (ISP), controller, video codec, digital signal processor (DSP), baseband processor, and/or neural network processor (NPU), etc. Different processing units can be independent devices or integrated in one or more processors.

The processor 103 provides computing and control capabilities. For example, the processor 103 is used to execute a computer program stored in the storage device 102 to implement the above-mentioned installation angle calibration method.

The I/O interface 104 is used to provide a channel for user input or output. For example, the I/O interface 104 can be used to connect various input and output devices, such as a mouse, keyboard, touch device, display screen, etc., so that the user can input information, or visualize information.

The I/O interface 104 can also be used to provide a channel for data transmission with the inertial measurement unit 106. For example, the I/O interface 104 can be used to obtain IMU data (such as first IMU data, second IMU data, etc.) from the inertial measurement unit 106.

Figure 2:
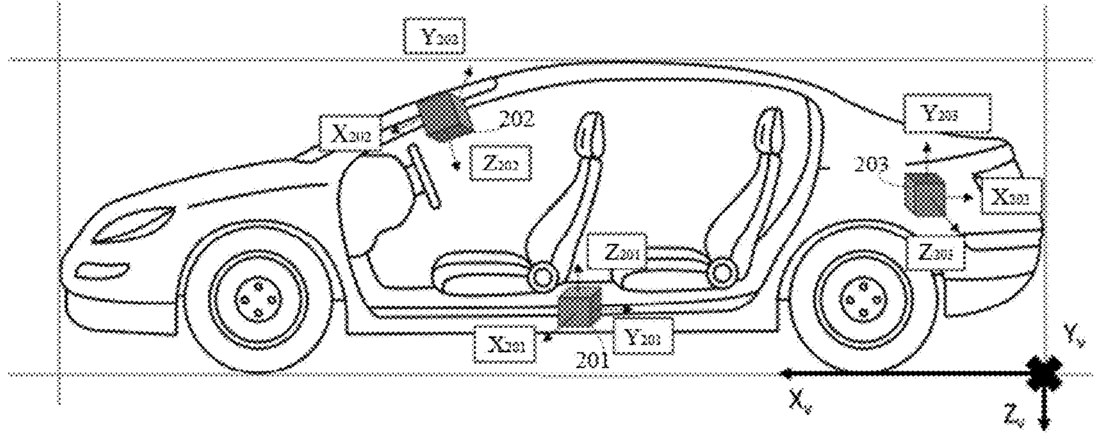
FIG. 2 is a schematic view of an embodiment of an IMU in a vehicle according to the present disclosure.

The IMU 106 includes at least one inertial measurement unit installed in the vehicle 1 for measuring the three-axis gesture angle (or angular rate) and acceleration of the vehicle. The inertial measurement unit may include a number of gyroscopes and accelerometers. For example, the inertial measurement device includes three gyroscopes and three accelerometers. Each of the gyroscopes and accelerometers can be used to measure the angular acceleration and linear acceleration of the vehicle in three dimensions; by integrating the acceleration and the superposition operation of the initial velocity and position, the inertial measurement unit can obtain the movement, direction and velocity of the vehicle in the spatial position. For example, FIG. 2 is a schematic view of an embodiment of an IMU in a vehicle according to the present disclosure. The IMU can be installed at any position on the vehicle.

The bus 105 is at least used to provide a channel for mutual communication between the communication module 101, the storage device 102, the processor 103, and the I/O interface 104 in the vehicle-mounted device 10.

It can be understood that the structure illustrated in the embodiment of the present application does not constitute a specific limitation on the vehicle-mounted device 10. In other embodiments, the vehicle-mounted device 10 may include more or less components than shown in the figures, or some components may be combined, some components may be separated, or some components may be arranged differently. The components illustrated may be implemented in hardware, software, or a combination of software and hardware.

Figures 3, 4:
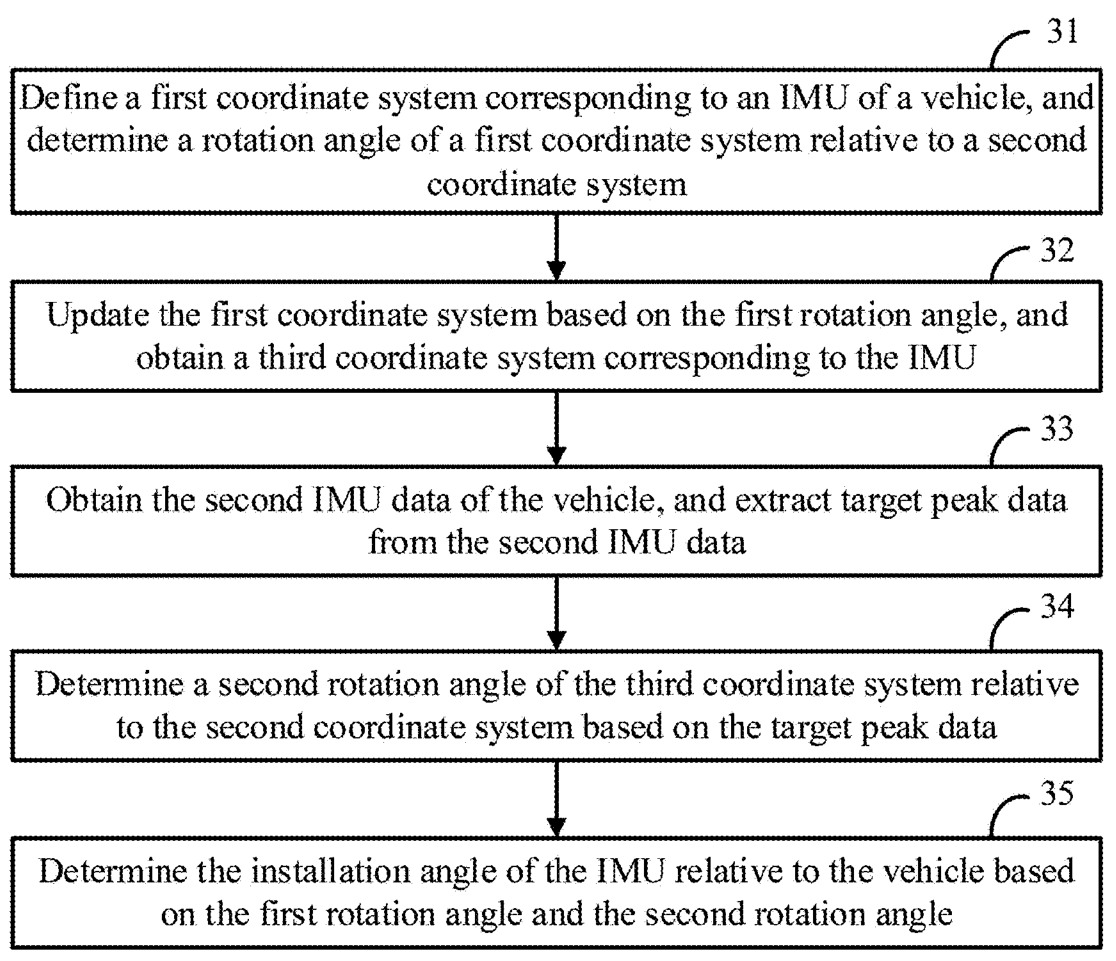
FIG. 3 illustrates a flowchart of an embodiment of an installation angle calibration method according to the present disclosure.
FIG. 4 is a schematic view of an embodiment of an original coordinate system of the IMU according to the present disclosure.

FIG. 3 illustrates a flowchart of an embodiment of an installation angle calibration method according to the present disclosure. The method is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 31.

At block 31, the vehicle-mounted device 10 defines a first coordinate system corresponding to an IMU of a vehicle according to first IMU data obtained from the IMU, and determines a rotation angle of a first coordinate system relative to a second coordinate system where the vehicle is located.

In one embodiment, at least one IMU is installed in the vehicle, and the vehicle-mounted device can receive a unique identification of each IMU input by the user to distinguish a number of IMUs installed in different positions.

In one embodiment, each IMU has a corresponding original coordinate system, since the direction of the IMU data (e.g., acceleration, angular velocity, etc.) obtained by the IMU is the direction of the original coordinate system in which it is located, when the installation angle of the IMU in the vehicle is unknown, the driving data (e.g., acceleration, angular velocity, etc.) of the vehicle cannot be determined based on the IMU data.

Therefore, it is necessary to calibrate the installation angle of the IMU in the vehicle, and obtain a transformation matrix between the original coordinate system of the IMU and the coordinate system of the vehicle (hereinafter referred to as a vehicle coordinate system), so as to transform the IMU data according to the transformation matrix, and obtain the vehicle driving data.

In one embodiment, a Z-axis direction of the vehicle coordinate system may be the direction (i.e., a direction perpendicular to the ground plane and pointing to the center of the earth) of gravity when the vehicle is stationary on a horizontal plane, and an X-axis direction of the vehicle coordinate system may be the direction of a front of the vehicle, a Y-axis direction of the vehicle coordinate system can be the direction determined based on the X-axis, Z-axis, and a right-hand rule. In other embodiments, the Y-axis direction of the vehicle coordinate system can also be determined according to a left-hand rule.

In one embodiment, after the IMU is installed in the vehicle, due to different installation angles of the IMU in the vehicle, the transformation matrices of the original coordinate systems of different IMUs relative to the vehicle coordinate systems are different. For example, referring to FIG. 2, the original coordinate system of the IMU 201 is expressed as $X_{201}\ Y_{201}Z_{201}$, the original coordinate system of the IMU 202 is expressed as $X_{202}\ Y_{202}Z_{202}$, the original coordinate system of the IMU 203 is expressed as $X_{203}\ Y_{203}Z_{203}$, the vehicle coordinate system is expressed as XvYvZv, it can be seen that the transformation matrices between the original coordinate systems of different IMUs and the coordinate system of the vehicle are different.

In one embodiment, the original coordinate system of the IMU may be determined according to the left-hand rule or the right-hand rule. For example, referring to FIG. 4, the original coordinate system (i.e., b-frame) of the IMU installed in the vehicle according to the right-hand rule can roughly have the six situations shown in FIG. 4.

In one embodiment, the transformation matrix of the original coordinate system of the IMU relative to the vehicle coordinate system may include a rotation angle between two coordinate axes in each dimension (e.g., X dimension, Y dimension, Z dimension) between different coordinate systems, that is, the installation angle of the IMU in the vehicle in three dimensions. For example, the installation angle of the IMU in the vehicle includes (roll φ, pitch θ, yaw ψ): roll φ represents an angle at which the IMU rotates around a longitudinal axis of the vehicle in the vehicle coordinate system, pitch θ represents an angle at which the IMU rotates around a lateral axis of the vehicle in the vehicle coordinate system, yaw ψ represents an angle of the IMU rotates around a vertical axis of the vehicle in the vehicle coordinate system.

Figure 5:
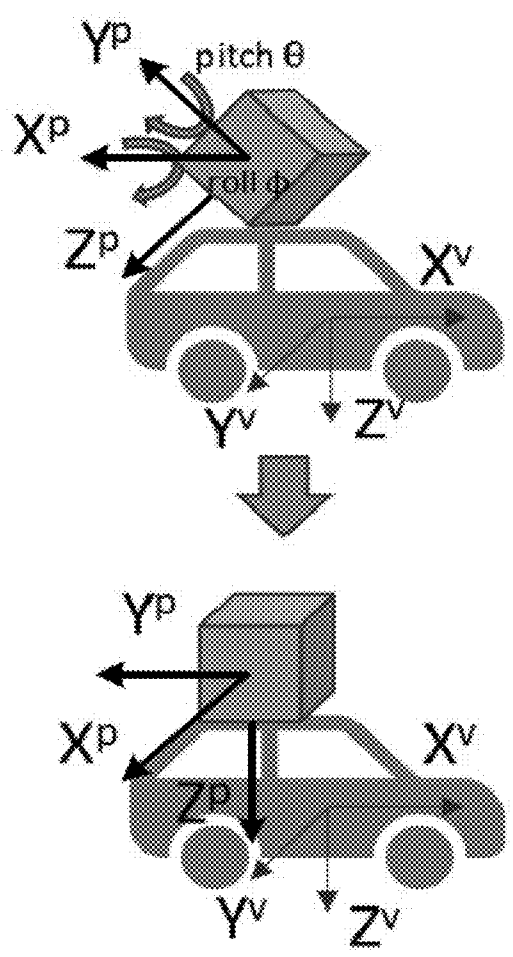
FIG. 5 is a schematic view of an embodiment of a horizontalization operation of an installation angle of the IMU in the vehicle according to the present disclosure.
Figure 6:
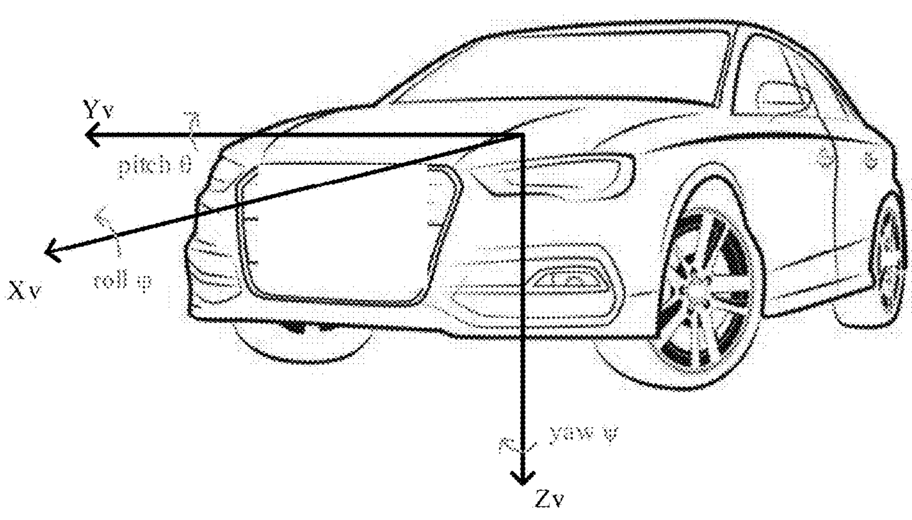
FIG. 6 is a schematic view of an embodiment of a positive rotation direction of a installation angle according to the present disclosure.

For example, referring to FIG. 5, an upper image is an example of the installation angle roll φ and pitch θ of the IMU in the vehicle; when the installation angle roll φ and pitch θ are obtained, the installation angle roll φ and pitch θ can be shown in the lower image in FIG. 5, the horizontal plane of the IMU is corrected to be consistent with the horizontal plane of the vehicle; then, the installation angle yaw ψ is obtained, thereby completing the calibration of the IMU. In other embodiments, each rotation angle in (roll φ, pitch θ, yaw ψ) can be further defined to be a positive rotation direction according to the vehicle coordinate system shown in FIG. 6. In the following embodiments, examples will be given based on the positive direction of the rotation angle as shown in FIG. 6.

The method for obtaining installation angle yaw ψ in related technologies requires other sensors (e.g., real-time dynamic positioning sensors) or complex calculation models (e.g., filter models), or requires to pre-determine an initial value of the IMU installation angle and then perform error calibration, or requires to be implemented in complex application environments, for example, a long straight road is required to enable the vehicle to reach a high speed or acceleration for error calibration, therefore, calculation cost is high and calculation efficiency is low, fast calibration of IMUs installed at any position of the vehicle cannot be realized. The method provided by the embodiment can solve the above problems and realize fast calibration of IMU installed at any position of the vehicle without additional cost.

In one embodiment, in order to obtain the installation angle roll φ and pitch θ of the IMU and correct the horizontal plane of the IMU to be consistent with the horizontal plane of the vehicle, the original coordinate system of the IMU may be updated to the first coordinate system first.

The vehicle-mounted device 10 defines a first coordinate system corresponding to an IMU of a vehicle according to first IMU data obtained from the IMU includes: the vehicle-mounted device 10 obtains the IMU data when the vehicle is in a stationary state as the first IMU data; determines a maximum value among the three original accelerations in the directions of the three original coordinate axes corresponding to the original coordinate system of the IMU according to the first IMU data, and determines the original coordinate axis corresponding to the maximum value as the target coordinate axis; defines a first vertical axis of the first coordinate system based on the target coordinate axis, and determines a first longitudinal axis and a first lateral axis of the first coordinate system based on the first vertical axis.

In one embodiment, the first IMU data when the vehicle is in a stationary state may include the three components of gravity acceleration in the three directions of the original coordinate system of the IMU, that is, three original accelerations of the three original coordinate axis directions corresponding to the original coordinate system of the IMU; the vehicle-mounted device 10 determines the original coordinate axis corresponding to the maximum value among the three original accelerations as the target coordinate axis; defines the first vertical axis of the first coordinate system according to the target coordinate axis, and then determines the first longitudinal axis and the first lateral axis of the first coordinate system according to the first vertical axis.

For example, as illustrated in FIG. 4, taking the original coordinate system of the IMU installed in the vehicle as the fourth case, if the value (or absolute value) of the original acceleration in the direction of the original coordinate axis Xb is the greatest, then the original coordinate axis Xb is determined as the target coordinate axis; since the direction of the target coordinate axis Xb is pointing above the ground, when defining the first vertical axis of the first coordinate system based on the target coordinate axis, the first vertical axis is determined to be −Xb, the rotation angle between the Z-axis direction of the first coordinate system and the Z-axis direction of the vehicle coordinate system is adjusted to an acute angle; the other two coordinate axes of the original coordinate system can be correspondingly adjusted according to the rules used to establish the vehicle coordinate system and the direction of the first vertical axis, for example, if the vehicle coordinate system complies with the right-hand rule, then according to the right-hand rule, the first longitudinal axis Xp is determined to be the original coordinate axis Zb, the first lateral axis Yp is determined to be the original coordinate axis Yb, and the first coordinate system XpYpZp is thus obtained.

In one embodiment, the second coordinate system in which the vehicle is located is the above-mentioned vehicle coordinate system XvYvZv, and the second vertical axis Zv of the second coordinate system is in the same direction as the gravity acceleration.

In one embodiment, the vehicle-mounted device 10 determines the first rotation angle of the first coordinate system relative to the second coordinate system in which the vehicle is located includes: the vehicle-mounted device 10 determines a first acceleration in the direction of the first longitudinal axis in the first coordinate system and a second acceleration in the direction of the first lateral axis in the first coordinate system based on the first IMU data; determines a first angle between the first longitudinal axis of the first coordinate system and the second longitudinal axis of the second coordinate system based on an inverse sine function of the ratio of the gravity acceleration and the first acceleration; determines a second angle between the first lateral axis of the first coordinate system and the second lateral axis of the second coordinate system based on an inverse sine function of the ratio of the gravity acceleration and the second acceleration; and determines the first angle and the second angle as the first rotation angle between the first coordinate system and the second coordinate system.

In one embodiment, the first acceleration and the second acceleration can be obtained based on the transformation relationship between the coordinate axes between the original coordinate system and the first coordinate system. In detail, the first longitudinal axis Xp in the first coordinate system is the original coordinate axis Zb, the first acceleration aX is the original acceleration in the direction of the original coordinate axis Zb in the first IMU data; the first lateral axis Yp in the first coordinate system is the original coordinate axis Yb, the second acceleration aY is the original acceleration in the direction of the original coordinate axis Yb in the first IMU data.

In one embodiment, when the first angle is pitch $\theta$, the inverse sine function of the ratio of the gravity acceleration and the first acceleration is: $\theta=\arcsin(aX/g)$, aX represents the first acceleration corresponding to the first longitudinal axis Xp, and g represents the gravity acceleration 9.8 $m/s^2$. For example, as illustrated in FIG. 5, $\theta=\arcsin(aX/g)$. For example, if $aX=-1.7\ m/s^2$, $g=9.8\ m/s^2$, $\theta=\arcsin(-1.7/9.8)*180/\pi=-10$ degrees; Xp points below the horizontal plane, so that the gravity acceleration component aX is a negative value.

Similarly, when the second angle is roll $\varphi$, the inverse sine function of the ratio of the gravity acceleration and the second acceleration is: $\varphi=-\arcsin(aY/g)$, aY represents the second acceleration corresponding to the first lateral axis Yp. For example, $aY=4.9\ m/s^2$, $g=9.8\ m/s^2$, $\varphi=-a\sin(4.9/9.8)*180/\pi=-30$ degrees; Yp points above the horizontal plane, so that the gravity acceleration component aY is a positive value.

At block 32, the vehicle-mounted device 10 updates the first coordinate system based on the first rotation angle, and obtains a third coordinate system corresponding to the IMU.

In one embodiment, the vehicle-mounted device 10 updates the first coordinate system based on the first rotation angle, and obtains a third coordinate system corresponding to the IMU includes: the vehicle-mounted device 10 establishes a rotation matrix based on the first rotation angle, rotates the first longitudinal axis and the first lateral axis of the first coordinate system based on the rotation matrix, and obtains the third coordinate system, and the third vertical axis of the third coordinate system and the second vertical axis of the second coordinate system are parallel to each other.

In one embodiment, after obtaining the first rotation angle, that is, the installation angle roll $\varphi$ and pitch $\theta$, as shown in the lower image in FIG. 5, the horizontal plane of the IMU can be corrected to be consistent with the horizontal plane of the vehicle, and the third coordinate system corresponding to the IMU can be obtained. The rotation matrix established based on the first rotation angle is used to rotate the first longitudinal axis and the first lateral axis of the first coordinate system, so that the third vertical axis of the updated third coordinate system and the second vertical axis of the second coordinate system are parallel to each other.

In one embodiment, as shown in the lower image in FIG. 5, the third coordinate system and the vehicle coordinate system have not yet been completely aligned, at this time, the vertical axes of the third coordinate system and the vehicle coordinate system are parallel to each other and there is installation angle yaw $\psi$.

Figure 7:
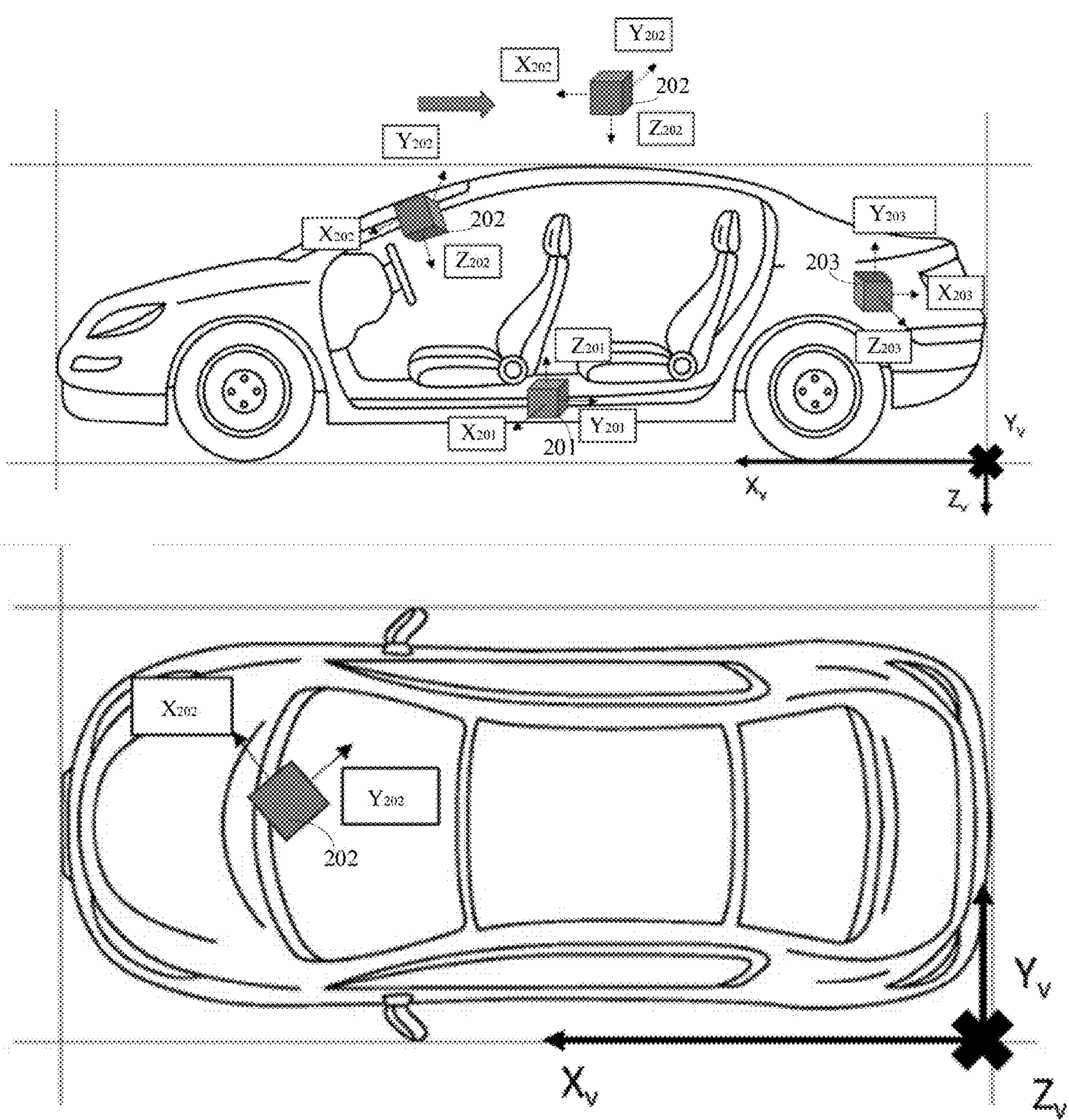
FIG. 7 is a schematic view of an embodiment of a third coordinate system of the installation angle according to the present disclosure.

In one embodiment, taking the IMU 202 in the upper image in FIG. 7 as an example, as indicated by the arrow in the upper image, the horizontal plane of the IMU 202 is corrected to be consistent with the horizontal plane of the vehicle, and the third coordinate system corresponding to the IMU is obtained; the horizontal plane of the third coordinate system of the IMU 202 may refer to the schematic view of the downward overlook view in FIG. 7.

At block 33, the vehicle-mount device 10 obtains the second IMU data of the vehicle, and extracts target peak data from the second IMU data.

In one embodiment, the vehicle-mount device 10 obtains the second IMU data of the vehicle, and extracts target peak data from the second IMU data includes: the vehicle-mount device 10 obtains the IMU data of the vehicle when turning as the second IMU data; determines a peak angular velocity in the direction of the third vertical axis of the third coordinate system that is greater than a preset threshold and a peak time node corresponding to the peak angular velocity; extracts the third acceleration in the direction of the third longitudinal axis of the third coordinate system and the fourth acceleration in the direction of the third lateral axis corresponding to the peak time node from the second IMU data, and determines the third acceleration and the fourth acceleration as the target peak data.

In one embodiment, since the third vertical axis of the third coordinate system of the IMU is parallel to the second vertical axis of the vehicle coordinate system, that is, the second coordinate system, the angular velocity (unit: degree/second) in the direction of the third vertical axis detected by the IMU when the vehicle is turning at a constant velocity can be used to indicate the rotation angular velocity of the vehicle, the acceleration in the direction of the third longitudinal axis and the acceleration in the direction of the third lateral axis detected by the IMU when the vehicle is turning at a constant velocity can be used to indicate the centripetal acceleration in the two directions of the vehicle.

In one embodiment, the IMU data of the vehicle when turning can be obtained at any curve as the second IMU data.

Figure 8:
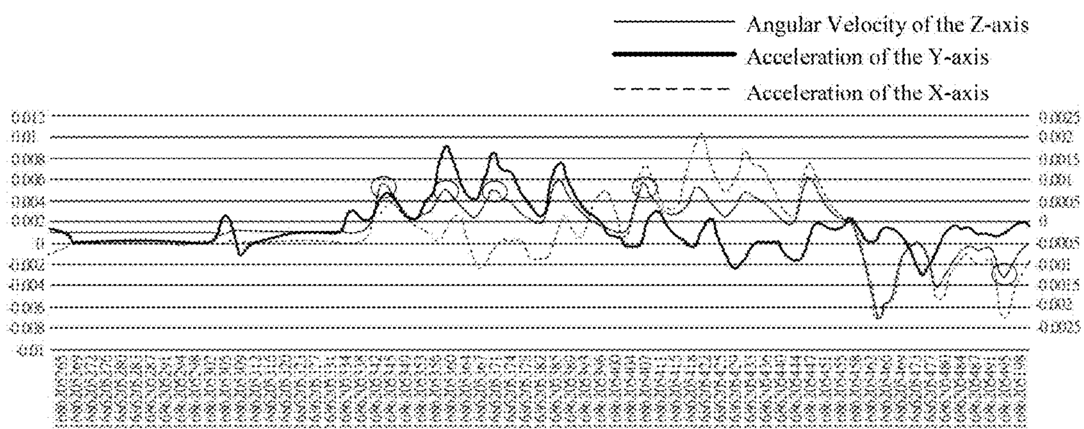
FIG. 8 is a schematic view of an embodiment of second IMU data according to the present disclosure.

In one embodiment, for example, FIG. 8 illustrates a schematic view of the second IMU data provided by the embodiment, the horizontal axis represents time, the left vertical axis represents the value of acceleration, and the right vertical axis represents the value of angular velocity; X acceleration represents the centripetal acceleration in the direction of the third longitudinal axis in the third coordinate system, Y acceleration represents the centripetal acceleration in the direction of the third lateral axis in the third coordinate system, and Z angular velocity represents the angular velocity in the direction of the third vertical axis in the third coordinate system. When the Z angular velocity is 0, it is indicated that the vehicle is traveling in a straight line. When the third coordinate system and the second coordinate system both conform to the right hand rule, the Z angular velocity that is greater than 0 indicates that the vehicle is traveling in the right turn, and the Z angular velocity that is less than 0 indicates that the vehicle is traveling in the left turn. When X acceleration, Y acceleration, and Z angular velocity are all equal to 0, it is indicated that the vehicle is stationary.

In one embodiment, a sliding window with a fixed length can be used to extract data from the second IMU data according to the principle of a real-time sliding window, the fixed length represents a preset time period.

In one embodiment, the second IMU data may include noises, in order to reduce the error caused by the noises, the second IMU data can be smoothed first, and then the peak angular velocity value in the direction of the third vertical axis can be selected from the data greater than the preset threshold, the peak angular velocity represents the peak data with the greatest absolute value of angular velocity within the second IMU data corresponding to the preset time period of each sliding window. The preset threshold can be selected according to actual requirements, such as 0.001. For example, as illustrated in FIG. 8, the selected peak angular velocity is the peak value within the circle.

In one embodiment, in order to determine the rotation angle in the direction of the third vertical axis, the third acceleration in the direction of the third longitudinal axis and the fourth acceleration in the direction of the third lateral axis of the third coordinate system are required, so that the target peak data corresponding to the peak time node is required to be extracted.

At block 34, the vehicle-mounted device 10 determines a second rotation angle of the third coordinate system relative to the second coordinate system based on the target peak data.

In one embodiment, the vehicle-mounted device 10 determines a second rotation angle of the third coordinate system relative to the second coordinate system based on the target peak data includes: the vehicle-mounted device 10 determines an included angle between the third longitudinal axis of the third coordinate system and the direction of the centripetal force on the vehicle when obtaining the second IMU data, based on the arctangent function of the ratio of the fourth acceleration and the third acceleration; and determines the second rotation angle according to the included angle and the turning direction of the vehicle when obtaining the IMU data.

Figure 9:
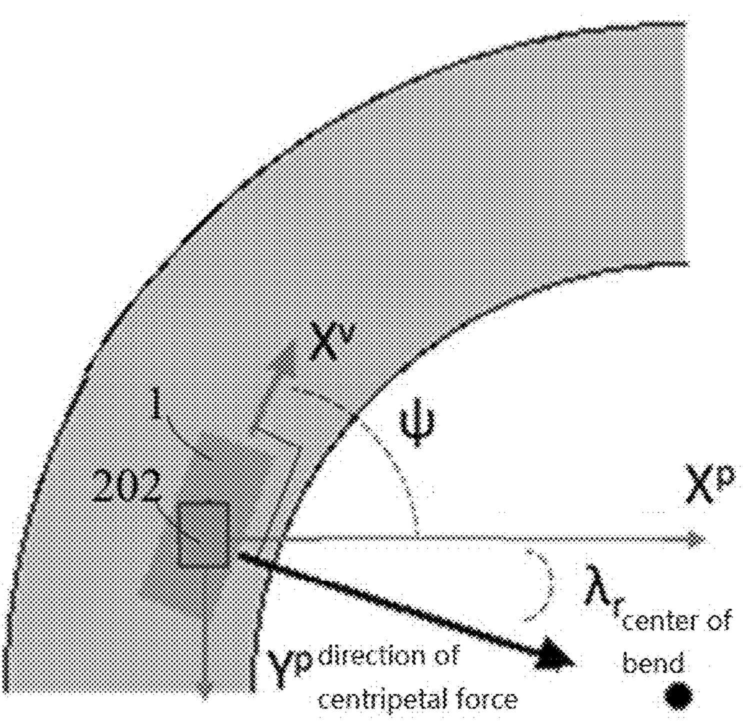
FIG. 9 is a schematic view of an embodiment of a centripetal force exerted on a vehicle when driving on a curve according to the present disclosure.

In one embodiment, for example, FIG. 9 illustrates a schematic view of a centripetal force exerted on a vehicle when driving on a curve. The velocity direction of the vehicle 1 is the direction of the second longitudinal axis Xv of the second coordinate system, the direction of the Xv axis is perpendicular to the direction of the centripetal force on the vehicle, after obtaining the included angle λr between the Xp axis of the IMU 202 and the direction of the centripetal force through the arctangent function of the ratio of the fourth acceleration and the third acceleration, the second rotation angle ψ can be determined according to the angle λr and the turning direction of the vehicle 1 when obtaining the second IMU data of the IMU 202. $\lambda r=\arctan(ay/ax)*180/\pi$, ay represents the fourth acceleration, and ax represents the third acceleration.

In one embodiment, the vehicle-mounted device 10 determines the second rotation angle according to the included angle and the turning direction of the vehicle when obtaining the IMU data includes: when the turning direction of the vehicle is a right turn, the vehicle-mounted device 10 determines the second rotation angle according to the difference between the included angle and the right angle; when the turning direction of the vehicle is a left turn, the vehicle-mounted device 10 determines the second rotation angle according to the sum of the included angle and the right angle. The turning direction of the vehicle may be determined based on the positive and negative values of the angular velocity in the second IMU data, in details, refer to the description of FIG. 8 at block S33.

In one embodiment, when the vehicle turns left, the direction of the Xv axis is turned to the direction of the centripetal force on the vehicle, which is 90 degrees to the left, when the vehicle turns right, the direction of the Xv axis is turned to the direction of the centripetal force on the vehicle, which is 90 degrees to the right, therefore, when determining the second rotation angle ψ according to the turning direction of the vehicle and the included angle λr, the formulas that can be used include: when the vehicle turns right, $\psi=\lambda r-90°$; when the vehicle turns left, $\psi=\lambda r+90°$. The turning direction of the vehicle can be determined based on the positive and negative Z angular velocity in the second IMU data.

For example, when the Z angular velocity is a positive value, the vehicle is turning right, ax=0.004, ay=0.001, then the calculation method of λr includes: $\lambda r=\arctan^2(ay/ax)*180/\pi=14$ degrees, then yaw $\psi=14-90=-76$ degrees; or, when the Z angular velocity is a negative value, the vehicle is turning left, ax=−0.004, ay=−0.001, the calculation method of λr includes: $\lambda r=\text{atan}^2(ay/ax)*180/\pi=194$ degrees, then yaw $\psi=194+90=284$ degrees.

In one embodiment, in order to improve the calculation accuracy of the second rotation angle ψ in the above embodiment, the method further includes: performing data optimization processing on a number of included angles determined based on a number of second IMU data, and determining the second rotation angle according to the optimal included angle obtained after data optimization processing. The data optimization processing may include removing the maximum value and the minimum value among the number of included angles and calculating an average value.

At block 35, the vehicle-mounted device 10 determines the installation angle of the IMU relative to the vehicle based on the first rotation angle and the second rotation angle.

Figure 10:
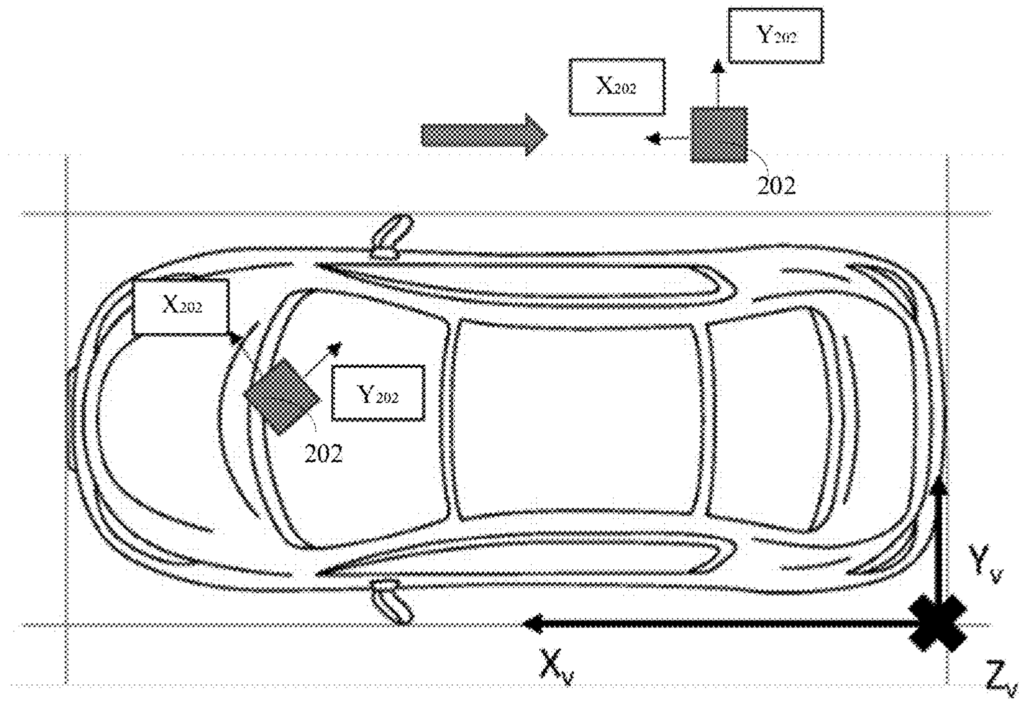
FIG. 10 is a schematic view of an embodiment of a coordinate system of the IMU aligned with the vehicle coordinate system according to the present disclosure.

In one embodiment, the first rotation angle roll $\varphi$ and pitch $\theta$ and the second rotation angle yaw $\psi$ obtained through the above embodiment can be determined as the installation angle of the IMU relative to the vehicle. By rotating the third vertical axis of the third coordinate system according to the second rotation angle yaw $\psi$, the coordinate system of the IMU can be aligned with the vehicle coordinate system. For example, as illustrated in FIG. 10, relative to the schematic view of the overlook view of FIG. 7, the arrow in FIG. 10 indicates the overlook view of the coordinate system of the IMU after rotating the third vertical axis according to the second rotation angle yaw $\psi$, and aligns with the vehicle coordinate system.

In one embodiment, after obtaining the installation angle of the IMU relative to the vehicle, the method further includes: obtaining third IMU data when a target user is driving the vehicle; correcting the third IMU data according to the installation angle, and obtaining the driving data of the vehicle; analyzing the driving behavior of the target user based on the driving data of the vehicle, the driving behavior analysis includes determining at least one of sudden acceleration, sudden deceleration, and sharp turns of the target user; scoring the driving behavior of the target user based on the results of the driving behavior analysis.

When correcting the third IMU data according to the installation angle, and obtaining the driving data of the vehicle, the installation angle can be used to establish a calibration matrix, and the driving data of the vehicle can be obtained by calculating the product of the vector of the third IMU data and the calibration matrix. When analyzing the driving behavior of the target user, the judgment can be made based on the preset numerical range, the more the above driving behaviors, the lower the driving stability of the target user and therefore the lower the score.

In other embodiments, after obtaining the installation angle of the IMU relative to the vehicle, the three-dimensional gesture of the vehicle, such as pitch, roll, heading, etc., can also be obtained based on the IMU data, thereby combining the motion trajectory settings in the inertial navigation system, correcting the course and velocity of the vehicle to achieve the navigation function. In addition, the calibrated IMU can also be used to assist in the calibration of other sensors (e.g., wheel velocity sensors, etc.) installed on the vehicle.

In one embodiment, the installation angle calibration method includes defining a first coordinate system corresponding to the IMU based on first IMU data obtained from the IMU of the vehicle, and determining a first rotation angle of a first coordinate system relative to a second coordinate system where the vehicle is located; updating the first coordinate system based on the first rotation angle, and obtaining a third coordinate system corresponding to the IMU; obtaining second IMU data of the vehicle, and extracting target peak data from the second IMU data; determining a second rotation angle of the third coordinate system relative to the second coordinate system based on the target peak data; determining the installation angle of the IMU relative to the vehicle, based on the first rotation angle and the second rotation angle. It is possible to calibrate the installation angle of the IMU based on the IMU data of the vehicle in different states without installing other sensors, using complex models, or resorting to complex application environments. It can calibrate the IMU at any angle installed at any position on the vehicle, the installation angle can be calibrated in real time, thereby reducing the cost and difficulty of IMU calibration and improving the efficiency of IMU calibration. In addition, sensor data obtained from other sensors can also be used to further improve the accuracy of IMU installation angle calibration.

Figure 11:
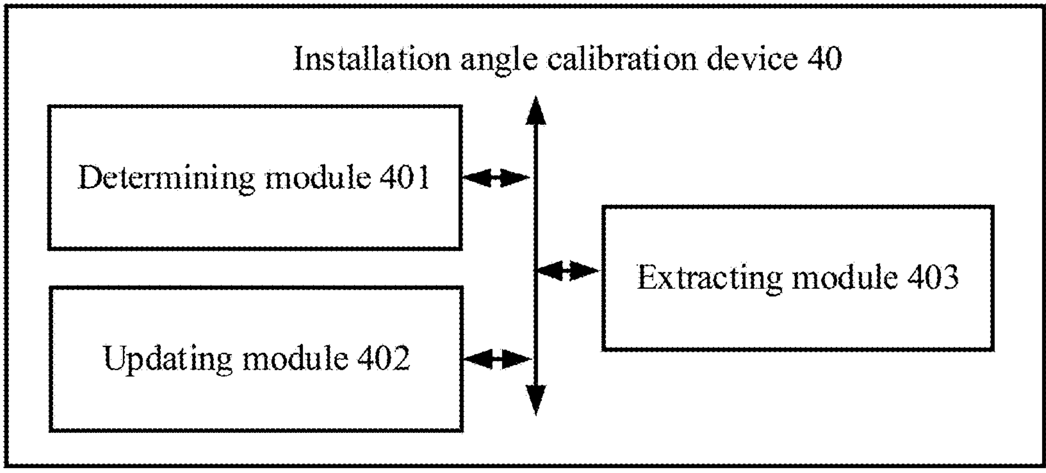
FIG. 11 is a block diagram of an embodiment of an installation angle calibration device according to the present disclosure.

FIG. 11 is a block diagram of an embodiment of an installation angle calibration device according to the present disclosure.

In some embodiments, the installation angle calibration device 40 may include a number of functional modules, the functional modules includes computer program segments. The computer program of each program segment in the installation angle calibration device 40 can be stored in the storage device of the vehicle-mounted device and executed by at least one processor to perform the installation angle calibration function (see FIG. 3 for details).

In this embodiment, the installation angle calibration device 40 can be divided into multiple functional modules according to the functions it performs. The functional modules may include: a determining module 401, an updating module 402, and an extracting module 403. The module referred to in this application refers to a series of computer program segments that can be executed by at least one processor and can complete a fixed function, which are stored in the memory. In this embodiment, regarding the functional implementation of each module in the installation angle calibration device 40, please refer to the above limitations on the installation angle calibration method, and the description will not be repeated here.

The determining module 401 is used to define a first coordinate system corresponding to an IMU of a vehicle according to first IMU data obtained from the IMU, and determine a rotation angle of a first coordinate system relative to a second coordinate system where the vehicle is located.

The updating module 402 is used to update the first coordinate system based on the first rotation angle, and obtain a third coordinate system corresponding to the IMU.

The extracting module 403 is used to obtain the second IMU data of the vehicle, and extract target peak data from the second IMU data.

The determination module 401 is further used to determine a second rotation angle of the third coordinate system relative to the second coordinate system based on the target peak data.

The determination module 401 is further used to determine the installation angle of the IMU relative to the vehicle based on the first rotation angle and the second rotation angle.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An installation angle calibration method implemented in a vehicle-mounted device comprising:

defining a first coordinate system corresponding to an IMU (Inertial Measurement Unit) of a vehicle according to first IMU data obtained from the IMU, and determining a rotation angle of the first coordinate system relative to a second coordinate system corresponding to the vehicle;

updating the first coordinate system based on the first rotation angle, and obtaining a third coordinate system corresponding to the IMU based on the updated first coordinate system;

obtaining second IMU data of the vehicle, and extracting target peak data from the second IMU data;

determining a second rotation angle of the third coordinate system relative to the second coordinate system based on the target peak data; and determining an installation angle of the IMU relative to the vehicle based on the first rotation angle and the second rotation angle.

2. The method according to claim 1, wherein defining a first coordinate system corresponding to an IMU of a vehicle according to first IMU data obtained from the IMU comprises:

obtaining the IMU data when the vehicle is in a stationary state as the first IMU data;

determining a maximum value among three original accelerations in the directions of three original coordinate axes corresponding to an original coordinate system of the IMU according to the first IMU data, and determining an original coordinate axis corresponding to the maximum value as the target coordinate axis;

defining a first vertical axis of the first coordinate system based on the target coordinate axis, and determining a first longitudinal axis and a first lateral axis of the first coordinate system based on the first vertical axis.

3. The method according to claim 1, wherein the second vertical axis of the second coordinate system is in the same direction as the gravity acceleration, determines the first rotation angle of the first coordinate system relative to the second coordinate system in which the vehicle is located comprises:

determining a first acceleration in the direction of the first longitudinal axis in the first coordinate system and a second acceleration in the direction of the first lateral axis in the first coordinate system based on the first IMU data;

determining a first angle between the first longitudinal axis of the first coordinate system and a second longitudinal axis of the second coordinate system based on an inverse sine function of a ratio of the gravity acceleration and the first acceleration;

determining a second angle between the first lateral axis of the first coordinate system and a second lateral axis of the second coordinate system based on an inverse sine function of a ratio of the gravity acceleration and the second acceleration; and determining the first angle and the second angle as the first rotation angle between the first coordinate system and the second coordinate system.

4. The method according to claim 1, wherein updating the first coordinate system based on the first rotation angle, and obtaining a third coordinate system corresponding to the IMU comprises:

establishing a rotation matrix based on the first rotation angle; and obtaining a third coordinate system by rotating the first longitudinal axis and the first lateral axis of the first coordinate system based on the rotation matrix, the third vertical axis of the third coordinate system and the second vertical axis of the second coordinate system being parallel to each other.

5. The method according to claim 1, wherein obtaining the second IMU data of the vehicle, and extracting target peak data from the second IMU data comprises:

when the vehicle is turning, obtaining IMU data of the vehicle as the second IMU data;

determining a peak angular velocity in a direction of a third vertical axis of the third coordinate system and a peak time node corresponding to the peak angular velocity, the peak angular velocity being greater than a preset threshold; and extracting the third acceleration in the direction of the third longitudinal axis of the third coordinate system and the fourth acceleration in the direction of the third lateral axis corresponding to the peak time node from the second IMU data, and determining the third acceleration and the fourth acceleration as the target peak data.

6. The method according to claim 5, wherein determining a second rotation angle of the third coordinate system relative to the second coordinate system based on the target peak data comprises:

determining an included angle between the third longitudinal axis of the third coordinate system and a direction of the centripetal force on the vehicle when obtaining the second IMU data, based on the arctangent function of a ratio of the fourth acceleration and the third acceleration; and determining the second rotation angle according to the included angle and the turning direction of the vehicle when obtaining the IMU data.

7. The method according to claim 6, wherein determining the second rotation angle according to the included angle and the turning direction of the vehicle when obtaining the IMU data comprises:

when the vehicle is turning right, determining the second rotation angle according to a difference between the included angle and the right angle;

when the vehicle is turning left, determining the second rotation angle according to the sum of the included angle and the right angle.

8. The method according to claim 6, further comprising:

performing a data optimization processing on a number of included angles determined based on a number of second IMU data; and determining the second rotation angle according to an optimal included angle obtained after data optimization processing.

9. A vehicle-mounted device comprising:

at least one processor; and a storage device storing instructions, which when executed by the at least one processor, cause the at least one processor to:

define a first coordinate system corresponding to an IMU of a vehicle according to first IMU data obtained from the IMU, and determine a rotation angle of a first coordinate system relative to a second coordinate system where the vehicle is located;

update the first coordinate system based on the first rotation angle, and obtain a third coordinate system corresponding to the IMU;

obtain the second IMU data of the vehicle, and extract target peak data from the second IMU data;

determine a second rotation angle of the third coordinate system relative to the second coordinate system based on the target peak data; and determine the installation angle of the IMU relative to the vehicle based on the first rotation angle and the second rotation angle.

10. The vehicle-mounted device according to claim 9, wherein the at least one processor is further caused to:

obtain the IMU data when the vehicle is in a stationary state as the first IMU data;

determine a maximum value among the three original accelerations in the directions of the three original coordinate axes corresponding to the original coordinate system of the IMU according to the first IMU data, and determine the original coordinate axis corresponding to the maximum value as the target coordinate axis;

define a first vertical axis of the first coordinate system based on the target coordinate axis, and determine a first longitudinal axis and a first lateral axis of the first coordinate system based on the first vertical axis.

11. The vehicle-mounted device according to claim 9, wherein the second vertical axis of the second coordinate system is in the same direction as the gravity acceleration, the at least one processor is further caused to:

determine a first acceleration in the direction of the first longitudinal axis in the first coordinate system and a second acceleration in the direction of the first lateral axis in the first coordinate system based on the first IMU data;

determine a first angle between the first longitudinal axis of the first coordinate system and the second longitudinal axis of the second coordinate system based on an inverse sine function of the ratio of the gravity acceleration and the first acceleration;

determine a second angle between the first lateral axis of the first coordinate system and the second lateral axis of the second coordinate system based on an inverse sine function of the ratio of the gravity acceleration and the second acceleration; and determine the first angle and the second angle as the first rotation angle between the first coordinate system and the second coordinate system.

12. The vehicle-mounted device according to claim 9, wherein the at least one processor is further caused to:

establish a rotation matrix based on the first rotation angle; and obtain a third coordinate system by rotating the first longitudinal axis and the first lateral axis of the first coordinate system based on the rotation matrix, the third vertical axis of the third coordinate system and the second vertical axis of the second coordinate system being parallel to each other.

13. The vehicle-mounted device according to claim 9, wherein the at least one processor is further caused to:

obtain the IMU data of the vehicle when turning as the second IMU data;

determine a peak angular velocity in the direction of the third vertical axis of the third coordinate system that is greater than a preset threshold and a peak time node corresponding to the peak angular velocity; and extract the third acceleration in the direction of the third longitudinal axis of the third coordinate system and the fourth acceleration in the direction of the third lateral axis corresponding to the peak time node from the second IMU data, and determine the third acceleration and the fourth acceleration as the target peak data.

14. The vehicle-mounted device according to claim 13, wherein the at least one processor is further caused to:

determine an included angle between the third longitudinal axis of the third coordinate system and the direction of the centripetal force on the vehicle when obtaining the second IMU data, based on the arctangent function of the ratio of the fourth acceleration and the third acceleration; and determine the second rotation angle according to the included angle and the turning direction of the vehicle when obtaining the IMU data.

15. The vehicle-mounted device according to claim 14, wherein the at least one processor is further caused to:

when the turning direction of the vehicle is a right turn, determine the second rotation angle according to the difference between the included angle and the right angle;

when the turning direction of the vehicle is a left turn, determine the second rotation angle according to the sum of the included angle and the right angle.

16. The vehicle-mounted device according to claim 14, wherein the at least one processor is further caused to:

perform data optimization processing on a number of included angles determined based on a number of second IMU data; and determine the second rotation angle according to the optimal included angle obtained after data optimization processing.

17. A non-transitory storage medium having stored thereon instructions that, when executed by a processor of an electronic device, causes the processor to perform an installation angle calibration method, the method comprising:

defining a first coordinate system corresponding to an IMU of a vehicle according to first IMU data obtained from the IMU, and determining a rotation angle of a first coordinate system relative to a second coordinate system where the vehicle is located;

updating the first coordinate system based on the first rotation angle, and obtaining a third coordinate system corresponding to the IMU;

obtaining the second IMU data of the vehicle, and extracting target peak data from the second IMU data;

determining a second rotation angle of the third coordinate system relative to the second coordinate system based on the target peak data; and determining the installation angle of the IMU relative to the vehicle based on the first rotation angle and the second rotation angle.

18. The non-transitory storage medium according to claim 17, wherein defining a first coordinate system corresponding to an IMU of a vehicle according to first IMU data obtained from the IMU comprises:

obtaining the IMU data when the vehicle is in a stationary state as the first IMU data;

determining a maximum value among the three original accelerations in the directions of the three original coordinate axes corresponding to the original coordinate system of the IMU according to the first IMU data, and determining the original coordinate axis corresponding to the maximum value as the target coordinate axis;

defining a first vertical axis of the first coordinate system based on the target coordinate axis, and determining a first longitudinal axis and a first lateral axis of the first coordinate system based on the first vertical axis.

19. The non-transitory storage medium according to claim 17, wherein the second vertical axis of the second coordinate system is in the same direction as the gravity acceleration, determines the first rotation angle of the first coordinate system relative to the second coordinate system in which the vehicle is located comprises:

determining a first acceleration in the direction of the first longitudinal axis in the first coordinate system and a second acceleration in the direction of the first lateral axis in the first coordinate system based on the first IMU data;

determining a first angle between the first longitudinal axis of the first coordinate system and the second longitudinal axis of the second coordinate system based on an inverse sine function of the ratio of the gravity acceleration and the first acceleration;

determining a second angle between the first lateral axis of the first coordinate system and the second lateral axis of the second coordinate system based on an inverse sine function of the ratio of the gravity acceleration and the second acceleration; and determining the first angle and the second angle as the first rotation angle between the first coordinate system and the second coordinate system.

20. The non-transitory storage medium according to claim 17, wherein updating the first coordinate system based on the first rotation angle, and obtaining a third coordinate system corresponding to the IMU comprises:

establishing a rotation matrix based on the first rotation angle; and obtaining a third coordinate system by rotating the first longitudinal axis and the first lateral axis of the first coordinate system based on the rotation matrix, the third vertical axis of the third coordinate system and the second vertical axis of the second coordinate system being parallel to each other.

* * * * *